(12) United States Patent
Almers et al.

(10) Patent No.: US 12,146,948 B2
(45) Date of Patent: Nov. 19, 2024

(54) AUTONOMOUS MOVING OBJECT WITH RADAR SENSOR

(71) Applicant: Acconeer AB, Lund (SE)

(72) Inventors: Peter Almers, Limhamn (SE); Bo Lincoln, Lund (SE); Rikard Nelander, Lund (SE); David Montgomery, Lund (SE); Gaston Holmén, Lund (SE)

(73) Assignee: ACCONEER AB, Lund (SE)

( * ) Notice: Subject to any disclaimer, the term of this patent is extended or adjusted under 35 U.S.C. 154(b) by 493 days.

(21) Appl. No.: 17/310,102

(22) PCT Filed: Jan. 24, 2020

(86) PCT No.: PCT/SE2020/050060
§ 371 (c)(1),
(2) Date: Jul. 16, 2021

(87) PCT Pub. No.: WO2020/153899
PCT Pub. Date: Jul. 30, 2020

(65) Prior Publication Data
US 2022/0091257 A1    Mar. 24, 2022

(30) Foreign Application Priority Data
Jan. 24, 2019 (SE) .................... 1950085-9

(51) Int. Cl.
*G01S 13/88* (2006.01)
*A01D 34/00* (2006.01)
*G05D 1/00* (2024.01)

(52) U.S. Cl.
CPC .......... *G01S 13/881* (2013.01); *A01D 34/008* (2013.01); *G05D 1/0088* (2013.01); *G05D 1/02* (2013.01)

(58) Field of Classification Search
CPC ...... G01S 13/881; G01S 13/931; G01S 13/89; G01S 13/42; A01D 34/008; G05D 1/0088; G05D 1/02
See application file for complete search history.

(56) References Cited

U.S. PATENT DOCUMENTS 6,377,872 B1 * 4/2002 Struckman ............. E02F 9/205
                                                      700/258
9,110,170 B1 * 8/2015 Woollard ................ G01S 13/89
(Continued)

FOREIGN PATENT DOCUMENTS

CN   107432719 A   12/2017
CN   108731736 A   11/2018
(Continued)

OTHER PUBLICATIONS

Supplementary European Search Report mailed Sep. 21, 2022, issued in corresponding European Application No. 20 74 5767, filed Jan. 24, 2020, 11 pages.
(Continued)

*Primary Examiner* — Timothy A Brainard
*Assistant Examiner* — Kenneth W Good
(74) *Attorney, Agent, or Firm* — Shih IP Law Group, PLLC (57) ABSTRACT

An autonomous moving object comprising a radar sensor is provided. The radar sensor is configured to, during movement, acquire data sets representing reflections from surface portions located within a distance range, and, at least at a sequence of occasions, illuminate a surface region and acquire a data set representing, for each of a set of distances within said distance range, an amplitude and a phase of reflected radar signals received from surface portions located at said distance. Said surface regions comprise common sub-region illuminated at each of said occasions. A radar signal processor is configured to receive the data sets
(Continued)

acquired at each of said sequence of occasions. The received data sets form a collection of data sets, wherein each data set of said collection comprises a data subset pertaining to said common sub-region. A surface classifier processor is configured to output a classification of a surface type of the surface based on said collection of data subsets.

19 Claims, 3 Drawing Sheets

(56) References Cited

U.S. PATENT DOCUMENTS

| | | | | |
|---|---|---|---|---|
| 10,183,676 | B2* | 1/2019 | Hoare | B60W 40/06 |
| 10,860,034 | B1* | 12/2020 | Ziyaee | G06N 3/045 |
| 11,181,634 | B1* | 11/2021 | Lue | G06N 3/045 |
| 11,479,213 | B1* | 10/2022 | Kentley-Klay | G05D 1/0246 |
| 11,500,087 | B2* | 11/2022 | Bagdonat | G08G 1/165 |
| 2004/0249258 | A1* | 12/2004 | Tupin, Jr. | A61B 5/05 600/407 |
| 2008/0039974 | A1 | 2/2008 | Sandin et al. | |
| 2013/0293408 | A1 | 11/2013 | Underwood et al. | |
| 2014/0214205 | A1 | 7/2014 | Kwon et al. | |
| 2014/0316634 | A1 | 10/2014 | Biber et al. | |
| 2015/0327742 | A1 | 11/2015 | Strang | |
| 2015/0347871 | A1 | 12/2015 | Sathyendra et al. | |
| 2016/0097847 | A1 | 4/2016 | Loesch et al. | |
| 2016/0274580 | A1 | 9/2016 | Jung et al. | |
| 2016/0313741 | A1* | 10/2016 | Lindhe | G05D 1/0274 |
| 2017/0176592 | A1 | 6/2017 | Hoare | |
| 2019/0310650 | A1* | 10/2019 | Halder | G06N 3/084 |
| 2020/0025868 | A1 | 1/2020 | Trummer | |
| 2021/0349181 | A1* | 11/2021 | Nishikido | G01S 13/347 |

FOREIGN PATENT DOCUMENTS

| | | |
|---|---|---|
| DE | 42 00 299 A1 | 7/1993 |
| DE | 197 15 999 A1 | 10/1998 |
| DE | 102013202075 A1 | 8/2014 |
| DE | 102015003115 A1 | 9/2016 |
| DE | 102017210964 A1 | 1/2019 |
| EP | 2315051 A1 | 4/2011 |
| EP | 3505959 A1 | 7/2019 |
| WO | 85/02266 A1 | 5/1985 |
| WO | 2008/141131 A2 | 11/2008 |
| WO | 2012163403 A1 | 12/2012 |
| WO | 2015132361 A1 | 9/2015 |
| WO | 2015153109 A1 | 10/2015 |
| WO | 2018087365 A1 | 5/2018 |
| WO | 2018154066 A1 | 8/2018 |
| WO | 2019/076812 A1 | 4/2019 |

OTHER PUBLICATIONS

International Search Report and Written Opinion mailed Mar. 13, 2020, issued in corresponding International Application No. PCT/SE2020/050060, filed Jan. 24, 2020, 11 pages.

Hertl, S. et al., "Contactless Determination of the Properties of Water Films on Roads," J Phys E: Sci. Instrum 21(10):955-958, Oct. 1988.

Kees, N., and J. Detlefsen, "Road Surface Classification by Using a Polarimetric Coherent Radar Module at Millimeter Waves," IEEE MTT-S International Micrwave Symposium, vol. 3, H.J. Kuno and C.P. Wen (eds.), San Diego, May 23-27, 1994, pp. 1675-1678.

Magerl, G., et al., "Remote Sensing of Road Condition," IEEE, Proceedings of the International Geoscience and Remote Sensing Symposium, Jun. 1991, pp. 2137-2140.

Swedish Search Report mailed Aug. 8, 2019, issued in corresponding Swedish Application No. 1950085-9, filed Jan. 24, 2019, 3 pages.

Yamauchi, Brian, "Daredevil: Ultra-Wideband Radar Sensing for Small UGVs," Proceedings of SPIE, vol. 6561, Unmanned Systems Technology IX, May 2007, pp. 65610B-1-65610B-19.

\* cited by examiner

AUTONOMOUS MOVING OBJECT WITH RADAR SENSOR

TECHNICAL FIELD

The present inventive concept relates to an autonomous moving object comprising a radar sensor, a radar signal processor and a surface classifier processor.

BACKGROUND

Autonomous mobile robots have become ubiquitous and find use in both industrial and consumer applications. Examples include robotic lawn mowers, cleaning robots, warehouse and transportation robots, as well as robotic toys and companion robots. Autonomous mobile robots may typically employ various sensors to obtain sensory input regarding the surroundings. Among others, information of a surface type traversed by the robot may be useful both for supporting navigation/positioning functions and control decisions. According to one example, the ability to distinguish between a lawn and an adjacent non-grass surface (e.g. a surface of a road or a walking path) could allow a robotic lawn mower to avoid deviating from a lawn and also determine when to start or stop cutting operation. According to another example, the ability to distinguishing between a carpet and a bare floor surface could allow a cleaning robot to dynamically control a cleaning mode and also a velocity in accordance with the floor type.

In the prior art, mobile robots have been provided with surface scanning optical or ultrasonic sensors. These sensor technologies may however provide a lower reliability than desired, for instance due to being sensitive to noise, dust, debris, color, ambient light and/or stray reflections from peripheral objects. Radar sensors are on the other hand relatively insensitive to stray light and sound sources. Radar signals can also penetrate materials which are non-transparent to optical wavelengths. A radar sensor may hence be mounted to be protected from ambient conditions and debris. Accordingly, a radar sensor may perform more consistently in various conditions, such as in environments where dust or other debris is prevalent.

SUMMARY OF THE INVENTIVE CONCEPT

As realized by the inventors, it may however be challenging to effectively use radar sensors for surface scanning in the above-mentioned autonomous mobile robot applications. Commercially available radar sensors suitable for such applications (i.e. compact, power efficient and preferably inexpensive sensors) may typically present a bandwidth which limits the ability to resolve the finer structure of the surface from a radar signal reflected by the surface. This may in turn render it challenging to reliably distinguish between differently textured surfaces and hence hinder reliable predictions of the surface type.

An objective of the present inventive concept is to at least partially address the above stated issue. Further and alternative objectives may be understood from the following.

According to an aspect of the present inventive concept there is provided an autonomous moving object comprising:

a radar sensor configured to, during movement of the moving object along a movement path along a surface, acquire radar reflection data sets representing radar reflections originating from reflecting surface portions located within a measurement distance range, wherein the radar sensor is configured to, at each measurement occasion of a temporal sequence of measurement occasions during the movement of the moving object along the movement path, illuminate a respective surface region and acquire a radar reflection data set pertaining to the illuminated surface region, the radar reflection data set representing, for each measurement distance of a set of measurement distances within said measurement distance range, an amplitude and a phase of reflected radar signals received from reflecting surface portions located at said measurement distance, and wherein said respective surface regions comprise a common sub-region which is illuminated at each one of said measurement occasions;

a radar signal processor configured to receive the acquired radar reflection data sets acquired at each one of said sequence of measurement occasions, wherein the received acquired radar reflection data sets form a collection of radar reflection data sets, wherein each radar reflection data set of said collection comprises a radar reflection data subset pertaining to said common sub-region; and a surface classifier processor configured to output a classification of a surface type of the surface based on said collection comprising said reflection data subsets pertaining to said common sub-region.

The inventive autonomous moving object (e.g. an autonomous moving robot such as a robotic vacuum cleaner, a robotic lawn mower, a warehouse robot, an autonomous moving robotic toy or an autonomous moving companion robot) provides a radar-based surface classification function enabling a more reliable distinction between different surface types. The radar data supporting the classification may be acquired by a single radar sensor. This enables a comparably inexpensive and low complexity solution.

Rather than merely estimating a surface type based on individual radar reflections or based on a radar reflection variation between a number of arbitrarily selected regions of the surface, the surface classifier processor outputs a classification of a surface type based on a collection of reflection data subsets pertaining to a common sub-region of the surface, i.e. a sub-region which is illuminated at each one of the plural measurement occasions of the sequence. Accordingly, the collection comprises data representing amplitude and phase for reflected signals from reflecting surface portions within the common sub-region acquired at each one of the positions assumed by the moving object at the measurement occasions of the sequence, as a function of measurement distance and time of the measurement occasions. Hence, the classification may be based on, not only on a single "instantaneous reflection signature" from an illuminated surface region, but rather on how the radar reflection data (i.e. representing amplitude and phase as a function of measurement distance and time) pertaining to reflecting surface portions within the common sub-region varies during the course of the movement. Access to these dynamic reflection properties of the surface sub-region may enable a considerably more reliable distinction between surfaces with different textures.

As an example intended to provide an illustrative explanation elucidating the merits of the present inventive concept, consider e.g. a robotic lawn mower traversing a lawn. A region of the lawn illuminated underneath the robot may comprise a comparably great number of reflecting surfaces (i.e. provided by randomly oriented straws of grass). The radar sensor may thus at each measurement occasion receive reflected radar signal contributions from a major part of the illuminated region. In particular, the radar sensor may receive a considerable reflected signal contribution from surfaces (individual straws of grass) located in front of and/or behind the radar sensor (i.e. the receiver of the radar sensor), as seen along the movement path. The bandwidth of the radar signals may per se be insufficient for resolving the individual reflecting surfaces (i.e. the individual straws of grass) at each individual measurement occasion. However, the presence of the reflecting surfaces may still manifest in the collection of reflection data sets as a substantial phase variation between consecutive measurement occasions at the measurement distances corresponding to the reflecting surfaces, e.g. due to Doppler-shifting and signal fading.

In contrast, consider a scenario where the robotic lawn mower traverses a smoother surface, such as a paved road or walking path. A major part of the reflected radar signals reaching the receiver of the radar sensor may then originate from surface portions located directly underneath the receiver of the radar sensor. (Illuminated surface portions in front of and/or behind the radar sensor may tend to reflect away from the radar sensor and may hence contribute relatively weakly to the total received signal.) Consequently, there may be a comparably small or even negligible phase variation between consecutive measurement occasions at the measurement distance corresponding to the major reflecting surface.

As may be appreciated, the above illustrative explanation may correspondingly apply to other scenarios, such as gravel compared to asphalt or concrete, a carpeted and bare floor, to give a few non-limiting examples.

A greater area of the common sub-region (i.e. the sub-region of the surface which is illuminated at each measurement occasion of the sequence of measurement occasions) enables radar reflection data subsets comprising more reflection data and may hence allow a more reliable classification. For many surface types relevant for autonomous moving objects such as robotic lawn mowers, cleaning robots, warehouse and transportation robots, robotic toys and companion robots, the area of the common sub-region may advantageously be at least 1 cm$^2$.

As stated above, the dynamic reflection properties made accessible by the radar reflection data subsets pertaining to the common sub-region may improve the ability to reliably distinguish between surfaces with different textures. However, it should be noted that the classification output by the surface classifier processor may be based on all data of the collection of radar reflection data sets, i.e. radar reflection data pertaining to the aggregate surface region illuminated in the temporal sequence of measurement occasions.

The autonomous moving object may further comprise a controller configured to receive the output from the surface classifier processor and, in response, output a control command configured to cause a changed movement of the moving object or a changed operation of the moving object. The autonomous moving object may accordingly take the surface classification into account for the purpose of taking control decisions (e.g. movement decisions to keep travelling on a surface of a particular type or avoiding a surface of a particular type).

The radar sensor is preferably configured to produce phase-coherent radar reflection data. Thus, the radar reflection data sets acquired at each one of the temporal sequence of measurement occasions may be phase-coherent with respect to each other.

The radar sensor may be configured to, at each measurement occasion of each one of a plurality of temporal sequences of measurement occasions, acquire a radar reflection data set representing, for each measurement distance of a set of measurement distances within said measurement distance range, an amplitude and a phase of reflected radar signals received from reflecting surface portions located at said measurement distance;

wherein the radar signal processor is configured to receive the acquired radar reflection data sets acquired at each one of said respective sequences of measurement occasions, wherein the received acquired radar reflection data sets acquired at each one of said respective sequences of measurement occasions forms a respective collection of radar reflection data sets, wherein each radar reflection data set of each respective collection of radar reflection data sets comprises a radar reflection data subset pertaining to a respective common sub-region; and wherein the surface classifier processor is configured to output a respective classification of a surface type of the surface based on each one of said respective collections. Surface classifications may accordingly be repeatedly output while the autonomous moving object moves along the surface, each surface classification being based on a respective collection of radar reflection data sets comprising data pertaining to a respective common sub-region of the surface. It should be noted that any processing or analysis described herein to be performed on radar reflection data sets for a sequence of measurement occasions, or a collection of radar reflection data sets, may be performed on each one of the respective radar reflection data sets, or respective collections of radar reflection data sets.

The autonomous moving object may further comprise a surface classifier post-processor configured to output a time filtered classification based on each one of the respective classifications. Thereby, data outliers may be suppressed and a more reliable classification may be obtained. The time filtered classification may for instance a median-filtered or averaged classification.

The surface classifier process may be configured to a binary prediction of surface type or a multiclass prediction of surface type. In some applications, it may be sufficient to determine whether the type of surface traversed by the autonomous moving object is of a particular type or not. In some applications, it may be desirable to distinguish between a number of different surface types. The surface classification processor may be configured to classify a surface type as an irregular surface type or a smooth surface type. For instance, the surface classification processor (e.g. of a robotic lawn mower) may be configured to classify a surface type as a grass-covered surface type or a non-grass surface type. For instance, the surface classification processor (e.g. of an autonomous cleaning robot) may be configured to classify a surface type as a carpet-covered floor surface type or a bare floor surface type.

The autonomous moving object may be operable in a training mode in which the autonomous moving object is configured to move along a training surface of a known surface type, wherein the radar sensor is configured to, during movement along the training surface, acquire radar reflection training data sets representing radar reflections originating from said training surface;

wherein the radar signal processor is configured to receive the acquired radar reflection training data sets acquired during said movement along the training surface, wherein the received acquired radar reflection training data sets form a training collection of radar reflection training data sets; and wherein the surface classifier processor is configured to receive a said training collection and a parameter representing the surface type of said training surface as a training input.

The surface classifier may accordingly be trained to associate collections of radar reflection data sets with the known surface type.

The measurement distance range may be sub-divided into a plurality of range bins, wherein each acquired radar reflection data set may represent an amplitude and a phase for each range bin (i.e. an amplitude and a phase of reflected radar signals within each range bin).

Each acquired radar reflection data set may advantageously comprise I/Q demodulated samples for each measurement distance of the set of measurement distances within the measurement distance range. Amplitude and phase of reflected radar signals may hence be obtained through I/Q demodulation. Accordingly, the radar reflection data set acquired at each measurement occasion may form a data container (e.g. a vector or array) of I/Q samples, wherein each I/Q sample pertains to a specific measurement distance from the radar sensor. The data container may comprise an I/Q sample for each measurement distance of the set of measurement distances within the measurement distance range. For instance, the measurement distance range may be sub-divided into a plurality of range bins, wherein the data container may comprise an I/Q sample for each range bin of the plurality or range bins of the measurement distance range.

The radar signal processor may be configured to pre-process the collection of radar reflection data sets, comprising the radar reflection data subsets pertaining to the common sub-region of the surface, to calculate a radar reflection metric as a function of amplitude, phase, measurement distance and time of measurement occasion. Since the radar reflection data subsets pertains to the common sub-region, the metric may represent a variation of amplitude and phase of reflected radar signals received from reflecting surface portions located in the common sub-region as a function of distance and time of measurement occasion (equivalent to position of the autonomous moving object/radar sensor along the movement lath at the measurement occasion).

The surface classifier processor may thus be configured to output the classification of the surface type based on the radar reflection metric. This may reduce the complexity and increase the reliability of the classification compared to performing classification directly on "raw" radar reflection data.

The radar signal processor is configured to pre-process said collection of radar reflection data sets by calculating one of: a frequency domain transform or an auto-covariance based on the radar reflection data sets of the collection.

The radar sensor may be configured to acquire the radar reflection data sets at positions along the movement path separated by ¼ of a radar signal wavelength, or less. Aliasing of the Doppler-shifted reflected signal responses may thereby be avoided.

The radar sensor may be configured to, at each one of the measurement occasions of the temporal sequence of measurement occasions, illuminate the respective surface region with a respective burst of radar pulses and acquire the radar reflection data set by performing time-diluted sampling of reflected radar pulses of said respective burst of radar pulses. Compared to a direct sampling of single radar pulse, a time-diluted sampling approach may lower the demands on the speed and accuracy of the acquisition circuitry of the radar sensor. Conversely, a time-diluted sampling approach may allow use of higher-frequency radar signals.

A duration of each radar pulse may be in the range of 50 ps to 10 ns. A carrier frequency of each radar pulse lies in the millimeter wave band, i.e. in the range of 30 GHz to 300 GHz.

Although the above aspect may be particularly advantageous in the context of controlling an autonomous moving object, such as an autonomous mobile robot, the above aspect may however present a more general applicability to other types of autonomous moving objects, such as an autonomous motor vehicle (e.g. a self-driving car, bus or truck). It is further contemplated that also a manually maneuvered motor vehicle (e.g. a conventional car, bus or truck) may be provided with a surface classification function, as set out above. Thus, there may according to a further inventive aspect be provided a motor vehicle comprising a radar sensor, a radar signal processor and a surface classifier processor as set out above (and optionally a surface classifier post-processor and/or a controller circuit etc. as set out above). The vehicle may hence be provided with a surface classification functionality which may support the control system of the vehicle and/or the driver with information relating to the surface type of the surface traversed by the vehicle, for instance, by determining whether the surface is a smooth asphalt surface or an irregular/rough road, such as a gravel road. The driver may for instance be provided with visual information about the surface type output by the surface classifier processor via an indicator or display of a vehicle dash board or the like.

BRIEF DESCRIPTION OF THE DRAWINGS

The above, as well as additional objects, features and advantages of the present inventive concept, will be better understood through the following illustrative and non-limiting detailed description of preferred embodiments of the present inventive concept, with reference to the appended drawings. In the drawings like reference numerals will be used for like elements unless stated otherwise.

DETAILED DESCRIPTION

Figure 1:
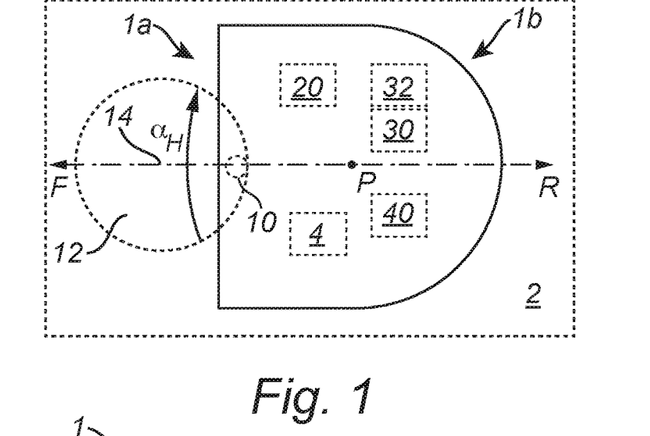
FIGS. 1 and 2 show respective top and side views of an autonomous mobile robot.
Figure 2:
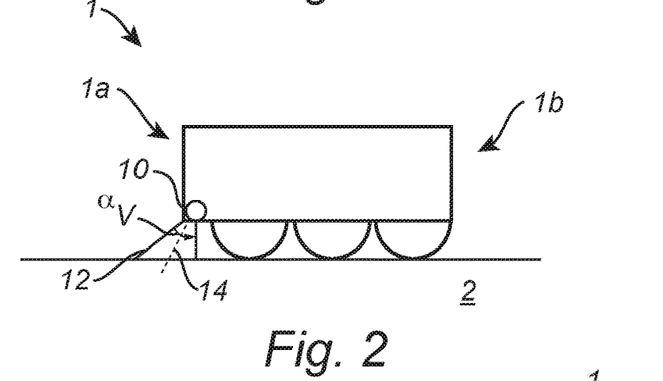

FIGS. 1 and 2 are top and side views, respectively, of an autonomous moving object in the form of an autonomous mobile robot 1 arranged on a surface 2. The robot 1 may be a robotic lawn mower. The surface 2 may thus be an outdoor surface such as a lawn, or a non-grass surface such as an asphalt surface of a road or a walking path. The robot 1 may also be a robot for indoor use, such as a robotic vacuum cleaner, an autonomous moving robotic toy, an autonomous moving companion robot or a warehouse robot. The surface 2 may thus be an indoor surface such as a carpeted floor, a bare floor (e.g. a plastic, a wooden, a concrete or a tile floor).

The robot 1 comprises a body, the periphery of which is schematically indicated in FIGS. 1 and 2. It should be noted that the peripheral shape schematically indicated is merely one example and other shapes are also possible, such as a rectangular shape or an oval or circular shape. The robot 1 comprises a drive sub-system 4 configured to maneuver the robot 1 along the surface 2. The drive sub-system 4 may include a wheeled drive sub-system including a number of wheel modules disposed underneath the robot 1 in such a manner that the robot 1 may move along the surface 2 in a forward direction F and a rearward direction R, as indicated in FIG. 1. The drive sub-system 4 may further be configured to allow the robot 1 to change its direction, for instance by rotating in a clockwise and counterclockwise direction around a vertical axis P extending through a substantially central portion of the body of the robot 1.

The robot 1 may further comprise a sub-system for performing one or more specific tasks. For example, if the robot 1 is a cleaning robot, the autonomous moving object 1 may comprise a cleaning sub-system (e.g. for dry- or wet-cleaning, a vacuum cleaning device, sweeping device such as rollers or brushes etc.) If the robot 1 is a robotic lawn mower, the robot 1 may comprise a grass cutting sub-system (e.g. cutters, knives etc.). Function specific sub-systems for robots of the above-mentioned type are per se known and will therefore not be discussed in further detail herein.

The robot 1 comprises a radar sensor 10. The radar sensor 10 is arranged on the robot 1. The radar sensor 10 may as shown be arranged on a front portion 1a of the robot 1. However, a rear-portion 1b arrangement of the radar sensor 10 is also possible. During use, the radar sensor 10 is configured to acquire radar reflection data sets representing radar reflections originating from reflecting surface portions of the surface 2, as will be further described in the following. The radar sensor 10 may be configured to transmit radar signals towards the surface 2. The radar sensor 10 may be configured to receive radar signals reflected from the surface 2. The radar sensor 10 may thus illuminate and receive reflected radar signals from (and hence "scan") a region of the surface 2 while moving along the surface 2.

FIGS. 1 and 2 illustrate a detection lobe 12 defined by the radar sensor 10. The detection lobe 12 may cover a surface region in front of the robot 1 and/or a surface region underneath the robot. It is however also possible to arrange the radar sensor 10 such that the detection lobe 12 covers a surface region behind the robot 1. The detection lobe 12 corresponds to the sensitive volume of the radar sensor 10 (e.g. defined by an overlap between a main transmission lobe of the radar sensor 10 and a main reception lobe of the radar sensor 10). In other words, the detection lobe 12 corresponds to the volume covered by the radar sensor 10. The detection lobe 12 may be defined by a main direction or principal axis 14. FIGS. 1 and 2 shows the portion of the detection lobe corresponding to the half power beam width (HPBW). A horizontal azimuthal angle $\alpha_H$ and a vertical elevation angle $\alpha_v$ of the detection lobe 12 may be defined as the horizontal and vertical angular HPBW, respectively. The horizontal azimuthal angle $\alpha_H$ may for instance be in the range of 30-100 degrees, such as about 50 degrees. The vertical elevation angle $\alpha_v$ may for instance be in the range of 30-100 degrees, such as about 80 degrees. The principal axis 14 may extend at an angle in the range of 60-100 degrees with respect to a main plane of the surface portion underneath the cleaning 1, preferably about 70 degrees.

The radar sensor 10 may comprise a transmitter circuit configured to transmit radar signals. The radar sensor 10 may comprise a transmitter antenna. The transmitter circuit may be configured to transmit the radar signal via the transmitter antenna. The radar sensor 10 may comprise a receiver circuit configured to receive and acquire radar signals. The radar sensor 10 may comprise a receiving antenna. The receiver circuit may be configured to receive the radar signal via the receiver antenna. Alternatively, the radar sensor 10 may include a single antenna configured for both transmission and reception of signals. The antenna(s) may be of a directional type, for instance a dipole antenna, a Yagi antenna or a phased array antenna. Optionally, a reflector such as a horn reflector may be arranged in connection with the radar sensor to improve the directionality of the radar sensor. In FIGS. 1 and 2 the radar sensor 10 is schematically shown as a single element comprising both the transmitter and receiver functionality. However, the radar transmitter and radar receiver need not be co-located but may be arranged at different positions of the robot 1. The level of the radar sensor 10 above the surface 2 may generally depend on factors such as the size of the robot 1, the clearance of the robot 1 above the surface 2, the availability of space on or within the body of the robot 1 etc. In a typical configuration, the transmitter/receiver antenna(s) of the radar sensor 10 may be arranged at a level of 1-50 cm above the surface 2 supporting the robot 1. This allows illumination of a surface region of a sufficient area for allowing surface classification as set out herein, especially if combined with the above indicated vertical elevation angle ranges $\alpha_v$.

The radar sensor 10 may be a phase-coherent radar sensor, i.e. a sensor able to produce phase-coherent radar reflection data, such that there is phase-coherence (a predetermined phase-relationship) between radar signals transmitted at temporally spaced measurement occasions.

The radar sensor may advantageously be of pulsed-type, which lends itself to power efficient implementations. However, a continuous wave-type of radar sensor is in principle also possible, such as a frequency modulated continuous wave radar. In any case, the radar sensor 10 may be configured to acquire radar reflection data representing an amplitude and a phase of reflected radar signals received from reflecting surface portions located at each measurement distance of a set of measurement distances within a measurement distance range. The radar sensor 10 may in other words be configured to perform a "depth scan". The radar sensor 10 may accordingly detect reflected radar signals from reflecting surfaces located within the detection lobe 12 at a distance from the radar sensor 10 covered by the measurement distance range. The radar sensor 10 may comprise an I/Q demodulator circuit configured to perform I/Q demodulation of received radar signals. The radar reflection data sets acquired by the radar sensor 10 may thus comprise I/Q demodulated samples for each measurement distance of the set of measurement distances within the measurement distance range.

In the following, an example operation of a radar sensor of a pulsed-type will be provided. By "pulse" (or interchangeably "wavelet") is hereby meant an electro-magnetic oscillating signal having a carrier frequency and a limited temporal extension. Each pulse may include a number of oscillations. Radar signals in the form of pulsed radar signals may be generated using various techniques. According to one example the radar sensor may include a transceiver module operating as a transmitter, as described in connection with FIG. 4 of the published PCT-application PCT/EP2011/058847 on page 11 lines 22-30. The transceiver module comprises: a tank circuit, a variable differential conductance (VDC), preferably in the form of a resonant tunneling diode (RTD), coupled to the tank circuit, and a variable resistance coupled to the VDC and arranged to bias the VDC into a region of positive differential conductance during a first state of operation of the transceiver, and bias the VDC into a region of negative differential conductance during a second state of operation of the transceiver. During the transceivers first state of operation no output signal is generated and during the second state of operation a sinusoidal radio frequency signal is generated. Thus, by switching the transceiver from the first state to the second state and back to first state again, a pulse or wavelet signal may be generated where the duration of the wavelet corresponds to the time the transceiver is in its second state of operation. Compared with other methods of wavelet generation, this implementation offers a low-complexity method for generating wavelets with a well-defined start position and duration and a coherent phase content within the wavelet which enables a phase dependent system implementation and low power consumption due to the pulsed operation. This particular implementation may enable generation of wavelets of a duration between 10 ns and 50 ps in the mm-wave band, which gives a theoretical range resolution of 1.5 m to 7.5 mm, respectively. The wavelet generator described above may however also be implemented using other oscillator configurations, for example, relying on negative differential conductance (e.g. provided by a cross-coupled differential pair) or positive feedback, where it is possible to start and quench the oscillations rapidly. Alternative implementations of wavelet generators include passing a continuous oscillation through a switchable amplifier, filtering of a baseband pulse, up-conversion of a baseband pulse, or using digital gates to create the desired waveform, as per se is known to the person skilled in the art.

The radar sensor 10 may be configured to acquire radar reflection data for each transmitted radar pulse reflected from the surface 2. A reflected radar pulse may be acquired by a direct sampling and digitizing approach each measurement occasion. Alternatively, the radar sensor 10 may be configured to, at each measurement occasions, illuminate a surface region with a burst of temporally spaced radar pulses and acquire radar reflection data set by performing time-diluted sampling of (a burst of) resulting reflected radar pulses. The radar sensor 10 may comprise a sliding-correlator circuit configured to mix each received reflected radar signal of the burst with a respective pulsed reference signal generated by the radar sensor at a predetermined delay with respect to the transmitted radar pulse of the burst giving rise to the reflected radar pulse, which delay is varied throughout the burst. The set of delays defines the measurement distance range of the radar sensor 10. The mixing products may be processed and combined to determine or reconstruct an approximation of a received signal. The transmission and acquisition of a burst of radar pulses at a measurement occasion may be referred to as a radar sweep in "fast time". Correspondingly, the measurement occasions are spaced in "slow time". The pulse repetition frequency of the burst of radar pulses in fast time may be orders of magnitude greater than the repetition frequency of the measurement occasions in slow time.

A specific example of a wavelet transmitter-receiver system having a "sliding-correlator functionality" is disclosed on page 15 line 14 to page 25 line 23 in the published PCT-application PCT/EP2015/054678 in connection with FIGS. 1 and 2 thereof. An example operation of the system including mixing of received and reference signals is given on page 33 lines 13-34 with reference to FIGS. 6 and 7 of PCT/EP2015/054678. It should however be noted that also other implementations allowing coherent generation of transmitted and reference signals with a controllable phase relationship and correlation of received signals with the reference signals are possible.

Referring again to FIG. 1, the robot 1 further comprises a radar signal processor 20 and a surface classifier processor 30. The radar sensor 10 may be configured to output radar reflection data for acquired radar responses to the radar signal processor 20. More specifically, the radar sensor 10 may be configured to output a respective radar reflection data set acquired at each measurement occasion. The radar signal processor 20 may in turn be configured to receive the acquired radar reflection data sets from the radar sensor 10. The radar signal processor 20 may perform various processing of the radar reflection data sets, as will be further described below. The radar signal processor 20 may thereafter output the (processed) radar reflection data sets to the surface classifier processor 30. The surface classifier processor 30 is configured to output a classification of a surface type of the surface based on reflection data subsets received from the radar signal processor 20, as described in the following.

The respective functions of the various functional elements of the robot 1, such as the radar sensor 10, the radar signal processor 20 and the surface classifier 30 may be implemented in respective dedicated circuitries, application-specific integrated circuits (ASICs) or field-programmable gate arrays (FPGAs). Microprocessor and software instruction-based implementations are also conceivable. For instance, the functions of e.g. the radar signal processor 20 and/or the surface classifier processor 30 may be implemented in binaries comprising instructions for a microprocessor. The binaries may be stored in a computer readable medium, such as a nonvolatile and non-transitory memory, and be configured to be executed by one or more microprocessors of the robot 1. The communication of data between the various functional entities of the robot 1, such as the radar sensor 10, the radar signal processor 20 and the surface classifier processor 30 may be performed via a communication interface, such as a data bus, of the robot 1.

Although indicated as separate entities in FIG. 1, one or more of the radar sensor 10, the radar signal processor 20 and the surface classifier processor 30 may be implemented in one or more co-located element(s) (e.g. circuits, ASICs, FPGAs etc.). Hence, the radar sensor 10, the radar signal processor 20 and the surface classifier processor 30 may represent different functional units implemented in different portions of a common circuit and/or by different software instructions being executed by a same microprocessor.

The robot 1 may further comprise a controller circuit 40 configured to take control decisions and coordinate interactions between the various functional entities of the robot 1. The controller circuit 40 may be configured to receive velocity data from the drive sub-system 4 and output the velocity data to for instance the radar sensor 10 and/or the surface classifier processor 30. The controller circuit 40 may be configured to receive a surface classification output by the surface classifier processor 30 and in response output a control command to the appropriate sub-system of the robot 1, for instance a movement command to the drive sub-system 4, a grass cutting command to a grass cutting sub-system of a robotic lawn mower, a cleaning command to a cleaning sub-system of a cleaning robot, etc. The controller circuit 40 may communicate with the relevant sub-system via a communication interface, such as the aforementioned data bus.

Figures 3A, 3B:
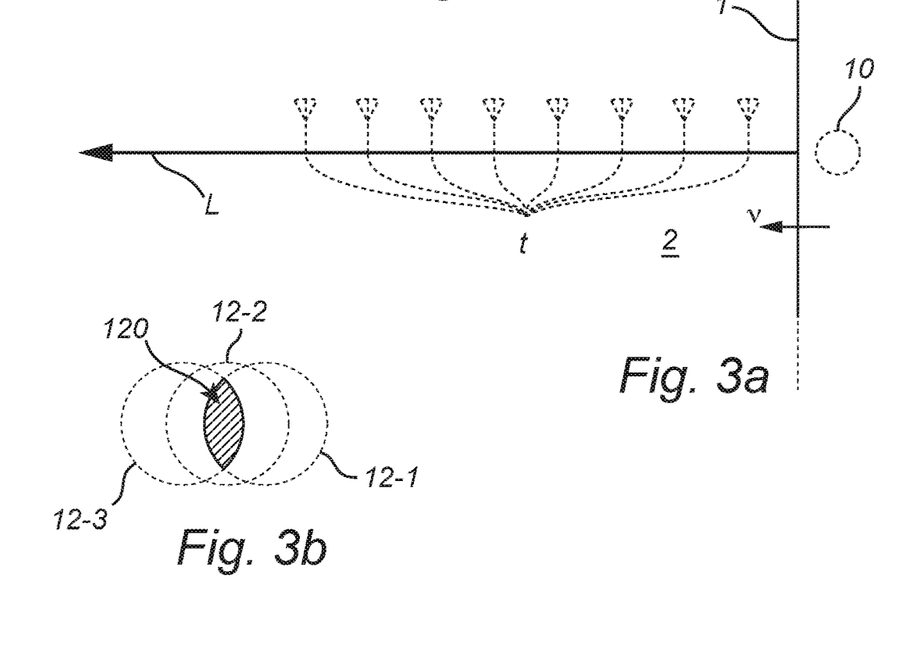
FIGS. 3*a* and 3*b* illustrates the operation of the robot.

The operation of the robot 1 will now be described in connection with FIGS. 3a-b. FIG. 3a shows the robot 1 moving along a movement path L along the surface 2, e.g. in a forward direction F. To facilitate understanding it will be assumed that the robot 1 moves along a straight line movement path at a constant velocity v. However as may be appreciated by the skilled person, surface classification as set out herein is possible also during movement along a curved movement path and/or during a period of variable (non-zero) velocity.

The radar sensor 10 is configured to repeatedly perform radar measurements during the movement, i.e. by illuminating a respective surface region and acquire a radar reflection data set pertaining to the illuminated surface region. Each radar measurement may constitute a respective measurement occasion performed at time t. The radar sensor 10 may accordingly acquire a radar reflection data set x(d) at each measurement occasion t. The acquisition may be performed using any of the afore-mentioned techniques.

Since the robot 1 moves between each successive measurement occasion, each measurement occasion occurs at a respective position of the robot 1. If the robot 1 moves with a constant velocity v the measurement occasions may be regularly spaced in time. If the robot 1 moves with a variable velocity v the measurement occasions may be variably spaced in time such that the radar measurements are performed with a regular spatial spacing. The radar sensor 10 may be continually updated with information regarding a current velocity v of the robot 1 at each measurement occasion by the controller 40. In FIG. 3*a*, the spatial separation between measurement occasions has been exaggerated for illustrative clarity. Radar measurement may advantageously be performed at least every ¼ of a radar signal wavelength. For a velocity in the range of 0.1 m/s to 10 m/s a repetition frequency of the measurement occasions may by way of example be about 80 Hz or greater. For a time-diluted/sliding-correlator sampling approach as described above, a corresponding pulse repetition frequency in "fast time" may be one or more orders of magnitude greater than the repetition frequency of the measurement occasions (i.e. in "slow time"). Thereby, the robot 1 may despite its movement be considered to be approximately stationary at each measurement occasion (i.e. each radar pulse of a burst of radar pulses will illuminate substantially the same surface region).

Over time, the radar sensor 10 may acquire, for each time t and measurement distance d, a radar reflection data set representing the amplitude and phase x(d,t) of reflected radar signals (i.e. detected objects at distance d) at the time t of the measurement occasion. If the radar sensor 10 is configured to perform I/Q demodulation, each radar reflection data set x(d,t) may be represented by a vector of complex numbers, each complex number of the vector representing a reading pertaining to a specific measurement distance d from the radar sensor at a specific time t.

The measurement range may be set such that surface 2 falls within the measurement range. As a non-limiting example, if the distance to the surface is 5 cm, a suitable measurement range may be 2-12 cm. The radar sensor 10 may be pre-configured with a suitable measurement range prior to use. It is however also possible for the radar sensor 10 to automatically configure the measurement range by, prior to commencing surface classification, measuring a distance D to the surface 2 and configure the measurement range such that the distance D falls therein, e.g. D±Δ, where Δ is a predetermined margin, e.g. based on a priori knowledge of the surface type(s) the robot 1 may encounter.

To facilitate data processing, the measurement range may be sub-divided into a plurality of range bins. The width of the range bins may be determined based on e.g. the range resolution of the radar sensor 10. By way of example the measurement range may be sub-divided into range bins of about 1 or a few millimeters.

The acquired radar reflection data set acquired at each measurement occasion are output to the radar signal processor 20. The radar signal processor 20 may aggregate a number T of the received radar reflection data sets x(d,t) into a collection of radar reflection data sets acquired at measurement occasions at time $t \in \{0, \ldots, T-1\}$. Each radar reflection data set x(d,t) of the collection comprises a subset of radar reflection data pertaining to a common surface region. The area of the common surface region may be set in accordance with circumstances but may advantageously be at least 1 cm². This may ensure that a sufficient number of Doppler-shifting reflecting surface portions are located within the common surface region to reveal the dynamic reflection properties of the surface 2. The overlap between surface regions illuminated at successive measurement occasions is schematically illustrated in FIG. 3*b*, where reference signs 12-1, 12-2, 12-3 represent surface regions illuminated at respective first, second and third measurement occasions. As may be seen, the regions 12-1, 12-2, 12-3 each comprise a common illuminated region 120. It should be noted that the number of surface regions depicted in FIG. 3*b* is merely an illustrative example. The number T of radar reflection data sets x(d, t) in a collection may generally depend on the velocity of the robot 1, the repetition frequency of the measurement occasions, the beam width and the distance from the surface 2 (e.g. of the transmitter/receiver antenna(s) of the radar sensor 10.

The number T of radar reflection data sets x(d, t) in a collection may by way of example be 8, 9, 10 or more.

The collection of radar reflection data sets x(d, t) is output to the surface classifier processor 30. The surface classifier processor 30 may in response output a classification of a surface type based on the collection of radar reflection data sets x(d, t).

The classifier processor 30 may be configured to perform a binary prediction of surface type or a multiclass prediction of surface type. A binary prediction may for instance be used by a robotic lawn mower to determine whether it traverses a lawn or a non-grass surface; or by a cleaning robot to determine whether it traverses a carpeted floor surface or a bare floor surface. A multiclass prediction may for instance be used by a robotic lawn mower to determine whether it traverses a lawn, dirt/soil or asphalt; or by a cleaning robot to determine whether it traverses a carpeted floor surface, a slightly textured floor surface, or a substantially smooth floor surface.

To reduce the amount of data to be processed by the surface classifier processor 30, the radar signal processor 20 may be configured to provide a post-processed radar reflection metric based on the collection of radar reflection data sets x(d, t) to the surface classifier processor 30. The surface classifier processor 30 may accordingly perform the classification of the surface type based on the radar reflection metric.

The radar signal processor 20 may be configured to process the collection of radar reflection data sets by performing a frequency domain transform, such as a Discrete Fourier Transform (DFT) or a Fast Fourier Transform (FFT) of the radar reflection data sets x(d, t) of the collection in time domain. An example metric is given by:

$$f_{FFT}(d, F) = \text{abs}(FFT_N(x_d(d, t)))$$

The radar signal processor 20 may be configured to process the collection of radar reflection data sets by calculating an autocovariance of the radar reflection data sets x(d,t) of the collection. An example metric is given by:

$$f_{autocovar}(d, t, l) = \frac{1}{T} \sum_{k=0}^{T-l-1} (x_d(d, t+k) - \mu_d) * (x_d(d, t+k+l) - \mu_d)$$

where $\mu_d$ is the complex average of the T radar reflection data sets of the collection (e.g. "slow-time" sweeps in a time-diluted sampling approach).

The radar signal processor 20 may be configured to process the collection of radar reflection data sets by calculating an energy variation metric of the radar reflection data sets x(d, t) of the collection. An example metric is given by:

$$x_{LPlong}(d, t) = \alpha x_{LPlong}(d, t-1) + (1-\alpha) x_d(d, t)$$

$$x_{LPshort}(d, t) = \beta x_{LPshort}(d, t-1) + (1-\beta) x_d(d, t)$$

$$f_{changes}(d, t) = \text{abs}(x_{LPlong}(d, t) - x_{LPshort}(d, t))$$

where $0 \leq \alpha \leq 1$ and $0 \leq \beta \leq 1$.

More generally, the radar signal processor 20 may be configured to calculate any radar reflection metric being a function of amplitude, phase, measurement distance and time of measurement occasion.

The above described acquisition, processing and classification may be performed continuously such that the surface classifier 30 repeatedly may output updated surface classifications, each surface classification being based on a respective collection of radar reflection data sets. Each surface classification may as mentioned above be provided as an input to the controller circuit 40 which in response may output a control command to cause a changed movement and/or operation of the robot 1.

The surface classifier processor 30 may be configured to process the collection of the T radar reflection data sets x(d,t) (or a corresponding metric) using a classification framework trained to perform a binary or multiclass prediction of a surface type. The classification framework may be trained using machine-learning. Machine-learning techniques are per se is known within the field of statistical classification and will therefore not be further described herein. The robot 1 may during a training mode move along and scan a "training surface" of a known surface type, using the approach set out above. The radar sensor 10 may thereby acquire radar reflection training data sets representing radar reflections originating from the training surface. The radar signal processor 20 may aggregate acquired radar reflection training data sets into a training collection of radar reflection training data sets. The above description relating to the collection of the T radar reflection data sets x(d, t) applies correspondingly to the training collection and the training radar reflection training data sets. Accordingly, a training collection may be determined, wherein each radar reflection training data set of the training collection comprises a subset of radar reflection data pertaining to a common surface region. Training collections may be provided as a training input to the classification framework. The classification framework may hence be trained to associate training collections representing the training surface with a surface category corresponding to the surface type of the training surface. Such a training sequence may be performed for any number of different surface types to enable multiclass prediction.

The classification framework of the surface classifier processor 30 need however not be based on machine learning. It is for instance also possible to configure the surface classifier processor 30 to output a classification of a surface type based on presence of specific frequency components (e.g. appropriately selected Doppler-components) exceeding a threshold amplitude.

Figure 4:
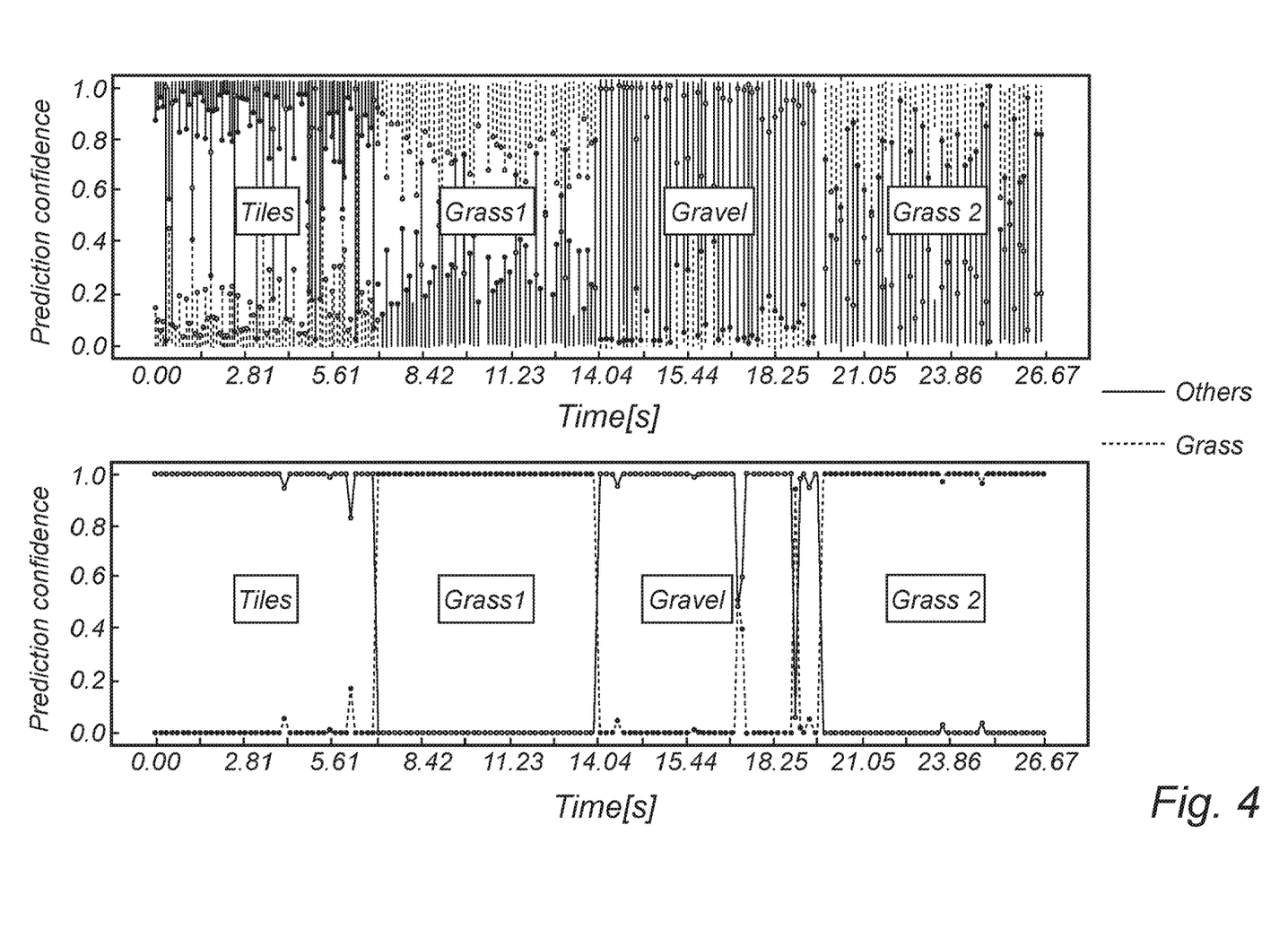
FIGS. 4 and 5 show classification results.

FIG. 4 illustrate binary classification results for a robot 1 traversing a surface of a tiles, followed by a grass-covered surface of a first type ("grass 1"), followed by a surface covered by gravel, followed by a gross-covered surface of a second type ("grass 2"). The classification framework has been trained to predict whether the surface type is of a grass-type of a non-grass type. Each point indicates classification output based on a collection of radar reflection data sets.

The upper portion of the FIG. 4 illustrates a comparative example base-line measurement where a classification is performed based on a radar reflection metric which does not take the variation over time into account:

$$f_{del}(d) = \text{abs}(x_d(d, t)), t \in \{0, \ldots, T-1\}$$

This may be considered equivalent to classifying the surface type based on a single "instantaneous reflection signature" from the illuminated surface region at each measurement occasion. The lower portion of FIG. 4 illustrates the classification output when any one of the above-mentioned metrics are used. As may be seen, a dramatic improvement in accuracy is provided.

Figure 5:
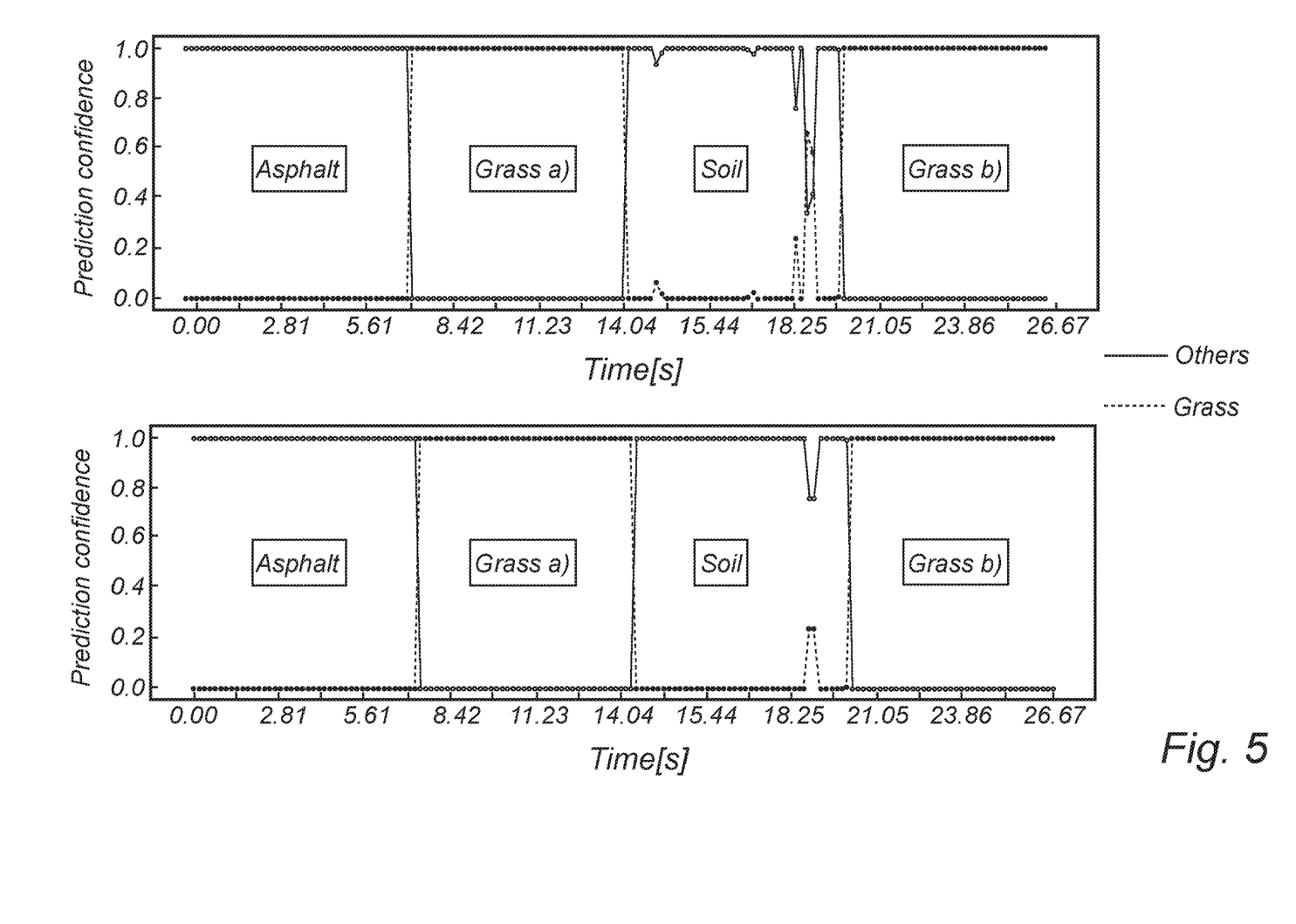

The upper portion of FIG. 5 illustrates a further binary classification result. The lower portion of FIG. 5 illustrates the additional improvement in accuracy which may be achieved by performing a time filtered classification based on each one of plurality of successive classifications, such as a median or majority decision filter. The robot 1 may comprise a surface classifier post-processor 32 configured to output a time filtered classification based on a sequence of a predetermined number of classifications output by the surface classifier processor 30. The time-filtered classification may in turn be provided as an input to the controller circuit 40 which in response may output a control command to cause a changed movement and/or operation of the robot 1 based on the time-filtered classification. The surface classifier post-processor 32 may be implemented in a e.g. a dedicated circuit, an ASIC an FPGA, or microprocessor/software instructions, separate from commonly with the surface classifier processor 30.

In the above the inventive concept has mainly been described with reference to a limited number of examples. However, as is readily appreciated by a person skilled in the art, other examples than the ones disclosed above are equally possible within the scope of the inventive concept, as defined by the appended claims.

Among others, further advantageous use cases for a surface classification output in a robotic lawn mower are contemplated: The robot 1 may make a turn and/or reverse movement in response to detecting a non-grass surface. The surface classifier processor 30 may be trained to distinguish between grass of different lengths wherein the robot 1 may selectively perform cutting in response to detecting a surface covered with grass exceeding a predetermined length threshold. Further advantageous use cases for a surface classification output in a cleaning robot are contemplated: The robot 1 may make a turn and/or reverse movement, or changing a cleaning mode, in response to detecting a carpet.

Moreover, other radar sensor configurations than the illustrated single radar transmitter-receiver pair configuration are possible. The robot 1 may for example comprise two or more radar sensors, each configured to acquire respective radar reflection data sets representing radar reflections originating from respective (overlapping or non-overlapping) reflecting surface portions at each measurement occasion. The radar signal processor 20 may perform data fusion of the radar data acquired by each radar sensor at each measurement occasion to generate a joint radar reflection data set representing radar reflections originating from the total surface illuminated by the radar sensors at each measurement occasion. Furthermore, the robot 1 may be provided with a radar sensor configuration comprising one or more radar transmitter and two or more radar receivers, or vice versa. Similar to the above example, the radar signal processor 20 may perform data fusion of the radar data acquired by the radar receiver(s) to generate a joint radar reflection data set representing radar reflections originating from the aggregate surface portions illuminated by the radar transmitter(s). In both cases, a collection of joint radar reflection data sets acquired during a sequence of measurement occasions may be used by the surface classifier processor 30 to output a classification of a surface type.

The invention claimed is:

1. A moving object comprising:
   a radar sensor configured to, during movement of the moving object along a movement path along a surface, acquire radar reflection data sets representing radar reflections originating from reflecting surface portions located within a measurement distance range,
   wherein the radar sensor is configured to, at each measurement occasion of a temporal sequence of measurement occasions during the movement of the moving object along the movement path, illuminate a respective surface region and acquire a radar reflection data set pertaining to the illuminated surface region, the radar reflection data set representing, for each measurement distance of a set of measurement distances within said measurement distance range, an amplitude and a phase of reflected radar signals received from reflecting surface portions located at said measurement distance, and wherein said respective surface regions comprise a common sub-region which is illuminated at each one of said measurement occasions;
   a radar signal processor configured to receive the acquired radar reflection data sets acquired at each one of said sequence of measurement occasions, wherein the received acquired radar reflection data sets form a collection of radar reflection data sets, wherein each radar reflection data set of said collection comprises a radar reflection data subset pertaining to said common sub-region, wherein the collection of radar reflection data sets represents amplitude and phase for reflected signals from reflecting surface portions within the common sub-region acquired at each one of the measurement occasions, as a function of measurement distance, and
   wherein the radar signal processor is configured to pre-process said collection of radar reflection data sets to calculate a radar reflection metric as a function of amplitude, phase, measurement distance and time of measurement occasion or measurement position along the path at the measurement occasion; and
   a surface classifier processor configured to output a classification of a surface type of the surface based on the radar reflection metric.

2. A moving object according to claim 1, wherein the radar sensor is configured to, at each measurement occasion of each one of a plurality of temporal sequences of measurement occasions, acquire a radar reflection data set representing, for each measurement distance of a set of measurement distances within said measurement distance range, an amplitude and a phase of reflected radar signals received from reflecting surface portions located at said measurement distance;
   wherein the radar signal processor is configured to receive the acquired radar reflection data sets acquired at each one of said respective sequences of measurement occasions, wherein the received acquired radar reflection data sets acquired at each one of said respective sequences of measurement occasions forms a respective collection of radar reflection data sets, wherein each radar reflection data set of each respective collection of radar reflection data sets comprises a radar reflection data subset pertaining to a respective common sub-region and wherein the radar signal processor is configured to pre-process each of said respective collections of radar reflection data sets, comprising the radar reflection data subsets pertaining to the common sub-region of the surface, to calculate a respective radar reflection metric for the respective collection as a function of amplitude, phase, measurement distance and time of measurement occasion or position of the moving object at the measurement occasion; and
   wherein the surface classifier processor is configured to output a respective classification of a surface type of the surface based on each respective radar reflection metric.

3. A moving object according to claim 2, further comprising a surface classifier post-processor configured to output a time filtered classification based on each one of said respective classifications.

4. A moving object according to claim 1, wherein said classification is a binary prediction of surface type or a multiclass prediction of surface type.

5. A moving object according to claim 1, wherein the moving object is operable in a training mode in which the moving object is configured to move along a training surface of a known surface type, wherein the radar sensor is configured to, during movement along the training surface, acquire radar reflection training data sets representing radar reflections originating from said training surface;
   wherein the radar signal processor is configured to receive the acquired radar reflection training data sets acquired during said movement along the training surface, wherein the received acquired radar reflection training data sets form a training collection of radar reflection training data sets; and
   wherein the surface classifier processor is configured to receive a said training collection and a parameter representing the surface type of said training surface as a training input.

6. A moving object according to claim 1, wherein each acquired radar reflection data set comprises I/Q demodulated samples for each measurement distance of said set of measurement distances within said measurement distance range.

7. A moving object according to claim 1, wherein the radar signal processor is configured to pre-process said collection of radar reflection data sets by calculating one of a frequency domain transform or an auto-covariance based on the radar reflection data sets of the collection.

8. A moving object according to claim 1, wherein said radar reflection data sets are acquired at positions along the movement path separated by ¼ of a radar signal wavelength, or less.

9. A moving object according to claim 1, wherein the radar sensor is configured to, at each one of said measurement occasions, illuminate said respective surface region with a respective burst of radar pulses and acquire said radar reflection data set by performing time-diluted sampling of reflected radar pulses of said respective burst of radar pulses.

10. A moving object according to claim 9, wherein a carrier frequency of each radar pulse lies in the millimeter wave band.

11. A moving object according to claim 1, wherein said common sub-region is at least 1 cm².

12. A moving object according to claim 1, further comprising a controller circuit configured to receive an output from the surface classifier processor and, in response, output a control command for controlling a movement and/or an operation of the moving object.

13. A moving object according to claim 1, wherein the moving object is an autonomous moving object.

14. A moving object according to claim 13, wherein the autonomous moving object is a robotic vacuum cleaner, a robotic lawn mower, a warehouse robot, an autonomous moving robotic toy or an autonomous moving companion robot.

15. A moving object according to claim 1, wherein the moving object is a motor vehicle.

16. A moving object according to claim 15, wherein the surface classifier processor is configured to support a control system of the motor vehicle and/or a driver of the motor vehicle with information relating to the surface type of the surface traversed by the motor vehicle.

17. A moving object according to claim 15, wherein the surface classifier processor is configured to provide a driver of the motor vehicle with visual information about the surface type output by the surface classifier processor via an indicator or display of a vehicle dash board.

18. A moving object comprising:
a radar sensor configured to, during movement of the moving object along a movement path along a surface, acquire radar reflection data sets representing radar reflections originating from reflecting surface portions located within a measurement distance range,
wherein the radar sensor is configured to, at each measurement occasion of a temporal sequence of measurement occasions during the movement of the moving object along the movement path, illuminate a respective surface region and acquire a radar reflection data set pertaining to the illuminated surface region, the radar reflection data set representing, for each measurement distance of a set of measurement distances within said measurement distance range, an amplitude and a phase of reflected radar signals received from reflecting surface portions located at said measurement distance, and wherein said respective surface regions comprise a common sub-region which is illuminated at each one of said measurement occasions,
wherein the radar sensor is configured to, at each one of said measurement occasions, illuminate said respective surface region with a respective burst of radar pulses and acquire said radar reflection data set by performing time-diluted sampling of reflected radar pulses of said respective burst of radar pulses;
a radar signal processor configured to receive the acquired radar reflection data sets acquired at each one of said sequence of measurement occasions, wherein the received acquired radar reflection data sets form a collection of radar reflection data sets, wherein each radar reflection data set of said collection comprises a radar reflection data subset pertaining to said common sub-region; and
a surface classifier processor configured to output a classification of a surface type of the surface based on said collection comprising said reflection data subsets pertaining to said common sub-region.

19. A method for classifying a surface type of a surface, the method comprising:
scanning a region of the surface along a path extending along the surface using a radar sensor, by, at each measurement occasion of a temporal sequence of measurement occasions, illuminate a respective surface region along the path, and acquire a radar reflection data set pertaining to the illuminated surface region, the radar reflection data set representing, for each measurement distance of a set of measurement distances within a measurement distance range, an amplitude and a phase of reflected radar signals received from reflecting surface portions located at said measurement distance, and wherein said respective surface regions comprise a common sub-region which is illuminated at each one of said measurement occasions;
receiving by a radar signal processor the acquired radar reflection data sets acquired at each one of said sequence of measurement occasions, wherein the received acquired radar reflection data sets form a collection of radar reflection data sets, wherein each radar reflection data set of said collection comprises a radar reflection data subset pertaining to said common sub-region, wherein the collection of radar reflection data sets represents amplitude and phase for reflected signals from reflecting surface portions within the common sub-region acquired at each one of the measurement occasions, as a function of measurement distance;
pre-processing, by the radar signal processor, said collection of radar reflection data sets to calculate a radar reflection metric as a function of amplitude, phase, measurement distance and time of measurement occasion or measurement position along the path at the measurement occasion; and
classifying, by a surface classifier processor, the surface type of the surface based on the radar reflection metric.

* * * * *